(12) United States Patent
Branson et al.

(10) Patent No.: US 8,639,809 B2
(45) Date of Patent: Jan. 28, 2014

(54) PREDICTIVE REMOVAL OF RUNTIME DATA USING ATTRIBUTE CHARACTERIZING

(75) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/860,000

(22) Filed: Aug. 20, 2010

(65) Prior Publication Data

US 2012/0047505 A1    Feb. 23, 2012

(51) Int. Cl.
*G06F 15/16*    (2006.01)

(52) U.S. Cl.
USPC .......................................... 709/225; 709/226

(58) Field of Classification Search
USPC .................................................. 709/225, 226
See application file for complete search history.

(56) References Cited

U.S. PATENT DOCUMENTS 7,769,806 B2 *   8/2010   Wie et al. ...................... 709/203
7,817,563 B1 *  10/2010   Buragohain et al. .......... 370/241

FOREIGN PATENT DOCUMENTS

JP    2005266953 A    9/2005
JP    2007041691 A    2/2007

OTHER PUBLICATIONS

Liudanni, Workflow Research and Application about Time Verification (Abstract only), Master's thesis, Applied Computer Technology, Dalian University of Technology, Dalian University of Technology Press, Dalian, China.

* cited by examiner

*Primary Examiner* — Adnan Mirza
(74) *Attorney, Agent, or Firm* — Patterson & Sheridan LLP

(57) ABSTRACT

Techniques are described for selectively removing runtime data from a stream-based application in a manner that reduces the impact of any delay caused by the processing of the data in the stream-based application. In addition to removing the data from a primary processing path of the stream-based application, the data may be processed in an alternate manner, either using alternate processing resources, or by delaying the processing of the data.

17 Claims, 6 Drawing Sheets

PREDICTIVE REMOVAL OF RUNTIME DATA USING ATTRIBUTE CHARACTERIZING

BACKGROUND

While computer databases have become extremely sophisticated, the computing demands placed on database systems have also increased at a rapid pace. Database systems are typically configured to separate the process of storing data from accessing, manipulating, or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated. This, in turn, can limit the ability of database applications to process large amounts of data in real-time.

SUMMARY

Embodiments of the invention provide a computer-implemented method, system and computer program product for processing a data stream. The method, system and computer program product include receiving a first tuple of the data stream to be processed, wherein the first tuple includes a plurality of attributes. The method, system and computer program product also include calculating an estimated processing time for processing the received first tuple of the data stream, based on at least in part one or more attributes of the plurality of attributes in the first tuple. Additionally, the method, system and computer program product include, upon determining the calculated estimated processing time does not exceed a predetermined threshold time, processing the first tuple of the data stream in a first manner using a first execution path. The method, system and computer program product further include upon determining the calculated estimated processing time exceeds the predetermined threshold time, processing the received first tuple of the data stream in a second manner that reduces a processing delay in the first execution path, relative to processing the first tuple in the first manner.

Alternate embodiments of the invention provide a computer-implemented method, system and computer program product for processing a data stream. The method, system and computer program product include receiving a first tuple of the data stream to be processed, wherein the first tuple includes a plurality of attributes. The method, system and computer program product also include calculating an estimated processing time for processing the received first tuple of the data stream, based on at least one of (i) one or more attributes of the plurality of attributes in the first tuple and (ii) metadata associated with the received tuple. Additionally, the method, system and computer program product include, upon determining the calculated estimated processing time does not exceed a predetermined threshold time, processing the first tuple of the data stream in a first manner using a first execution path. The method, system and computer program product further include upon determining the calculated estimated processing time exceeds the predetermined threshold time, processing the received first tuple of the data stream in a second manner that reduces a processing delay in the first execution path, relative to processing the first tuple in the first manner.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
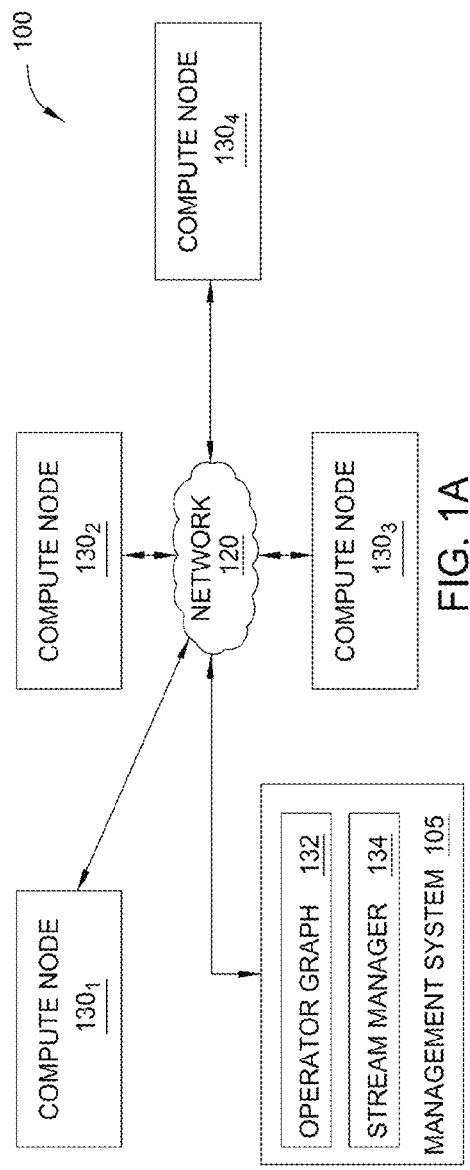
FIGS. 1A-1B illustrate a computing infrastructure 100 configured to execute a stream application, according to one embodiment of the invention.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, and often in milliseconds. Constructing an application using this type of processing opens up a new programming paradigm allowing for a broad variety of innovative applications, systems, and processes to be developed, as well as present new challenges for application programmers and database developers.

In a stream application, operators are connected to one another such that data flows from one processing element to the next (e.g. over a TCP/IP socket). Scalability is reached by distributing an application across nodes by creating many small executable pieces of code (operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application, as well as fused or un-fused from a stream application during runtime.

One advantage to stream applications is that they allow the user to granularly control the process flow of data through the application. In other words, the user may designate specific operators for each processing element that perform various operations on the incoming data, and may dynamically alter the stream application by modifying the operators and the order in which they are performed. Additionally, stream applications are able to handle large volumes of data while limiting any "bottlenecks" in the processing. Nonetheless, in many cases, bottlenecks will still arise that may cause parts of the stream application to slow down. Furthermore, the problems created by such a bottleneck may continue to compound as additional data is received. As such, for stream applications where the incoming data must be processed as close to real-time as possible, any potential bottlenecks should be avoided, as they may have a severe impact on the application's performance and the application's ability to process the incoming data in real-time.

Embodiments of the invention provide techniques for identifying incoming stream data that likely cannot be processed within a threshold amount of time, and removing the incoming stream data from a primary execution path. In particular, embodiments of the invention provide techniques for calculating an estimated processing time for a received tuple of a data stream, and determining whether to process the received tuple based on the calculated estimated processing time. For example, assume that the average processing time for a given processing element to process a tuple is 5 milliseconds. If embodiments of the invention receive a particular tuple and calculate that it will take approximately 5 minutes for the given processing element to process the particular tuple, embodiments of the invention may then prevent the given processing element from processing the tuple. As such, embodiments of the invention may prevent bottlenecks in the stream application. Additionally, in certain embodiments, the particular tuple may then be processed using other resources, outside of the primary execution path.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

Figure 1B:
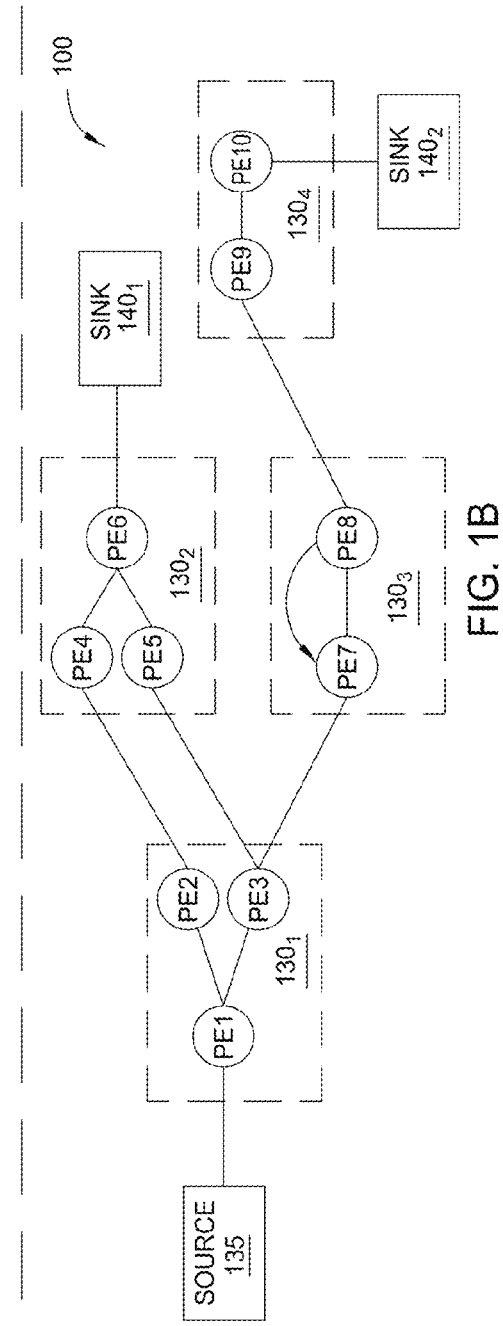

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from one or more source processing elements (PEs) through to one or more sink PEs. This flow from source to sink is also generally referred to herein as an execution path. Generally, data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. Additionally, the processing elements could be configured to receive or emit data in formats other than an N-tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream application running on the compute nodes $130_{1-4}$, as well as to change the structure of the operator graph 134. For example, the stream manager 134 may move processing elements (PEs) from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$. In one embodiment of the invention, the management system 105 may maintain multiple operator graphs 132. In such an embodiment, one operator graph 132 designated as primary operator graph, which represents the general or default processing flow, and the other operator graphs may represent alternate processing flows.

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data elements received in a tuple and pass some data elements to PE2, while passing other data elements to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Figure 2:
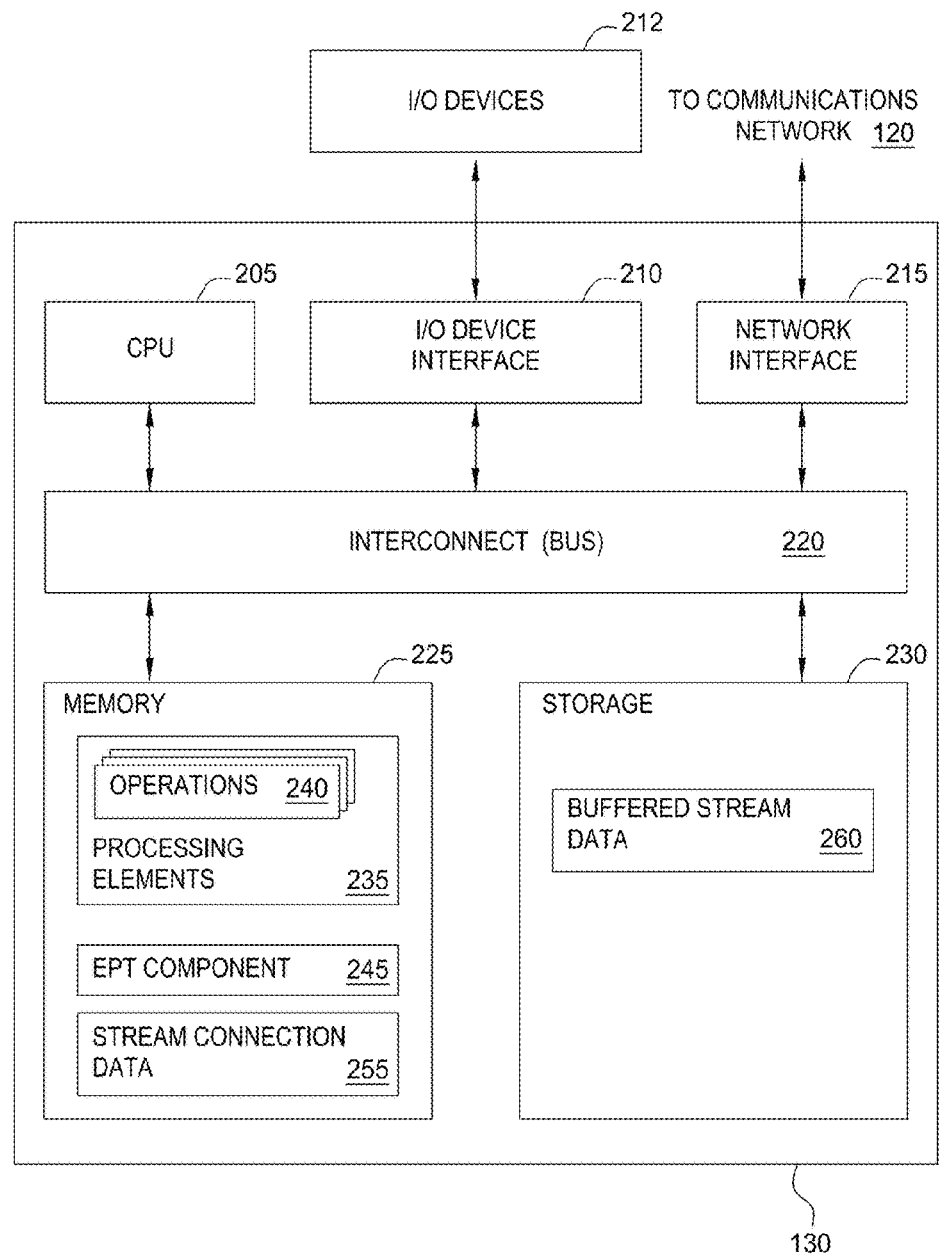
FIG. 2 is a more detailed view of the compute node 130 of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a plurality of processing elements (PE) 235, an estimated processing time (EPT) component 245, and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other PEs in the stream application. Such PEs may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream application, also via TCP/IP sockets (or other inter-process data communication mechanisms).

Buffered stream data 260 represents a storage space for data flowing into the compute node 105 from upstream processing elements (or from a data source for the stream application). For example, buffered stream data may include data tuples waiting to be processed by one of the PEs 235. Buffered stream data 260 may also store the results of data processing performed by PEs 235 that will be sent to downstream processing elements.

The EPT component 245 may receive incoming tuples of a data stream to be processed on one of the PEs 235. Generally, the received tuples may come from a source 135, or alternatively may be the output of another PE in the system 100. Upon receiving the tuple, the EPT component 245 may calculate an estimated processing time to process the given tuple. In one embodiment, the estimated processing time is calculated based on one or more attributes contained in the given tuple. In another embodiment, the estimated processing time is calculated based on metadata collected about the given tuple. In yet another embodiment, the estimated processing time is calculated based on historical data collected from other tuples processed using the PEs 235. Once the estimated processing time is calculated, the EPT component 245 may then determine whether the estimated processing time exceeds a predetermined threshold time. If the estimated processing time does not exceed the predetermined threshold time, the EPT component 245 may send the given tuple to the appropriate PE 235 to be processed.

Alternatively, if the estimated processing time exceeds the predetermined threshold time, the EPT component 245 may remove the given tuple from the primary execution path. In one embodiment of the invention, the EPT component 245 may send the given tuple to an alternate execution path to be processed. For example, assume that the primary execution path specifies that the given tuple is to be processed using a first PE 235. If the EPT component 245 determines the estimated processing time exceeds the predetermined threshold time, the EPT component 245 may then route the given tuple to a second PE 235, according to an alternate execution path. In another embodiment of the invention, upon determining that the estimated processing time exceeds the predetermined threshold time, the EPT component 245 delays processing the given tuple. For example, the EPT component 245 may delay the processing of the tuple until the PE 235 specified by the primary execution path becomes idle. In an alternate embodiment, upon determining that the estimated processing time exceeds the predetermined threshold time, the EPT component 245 discards the given tuple of the data stream. In such an alternate embodiment, the EPT component 245 may generate a message indicating that the given tuple was discarded. Illustratively, and without limitation, the EPT component 245 may then store the generated message in a log file, or may convey such a message to the user (e.g., using an I/O device 212 such as a monitor).

Figure 3:
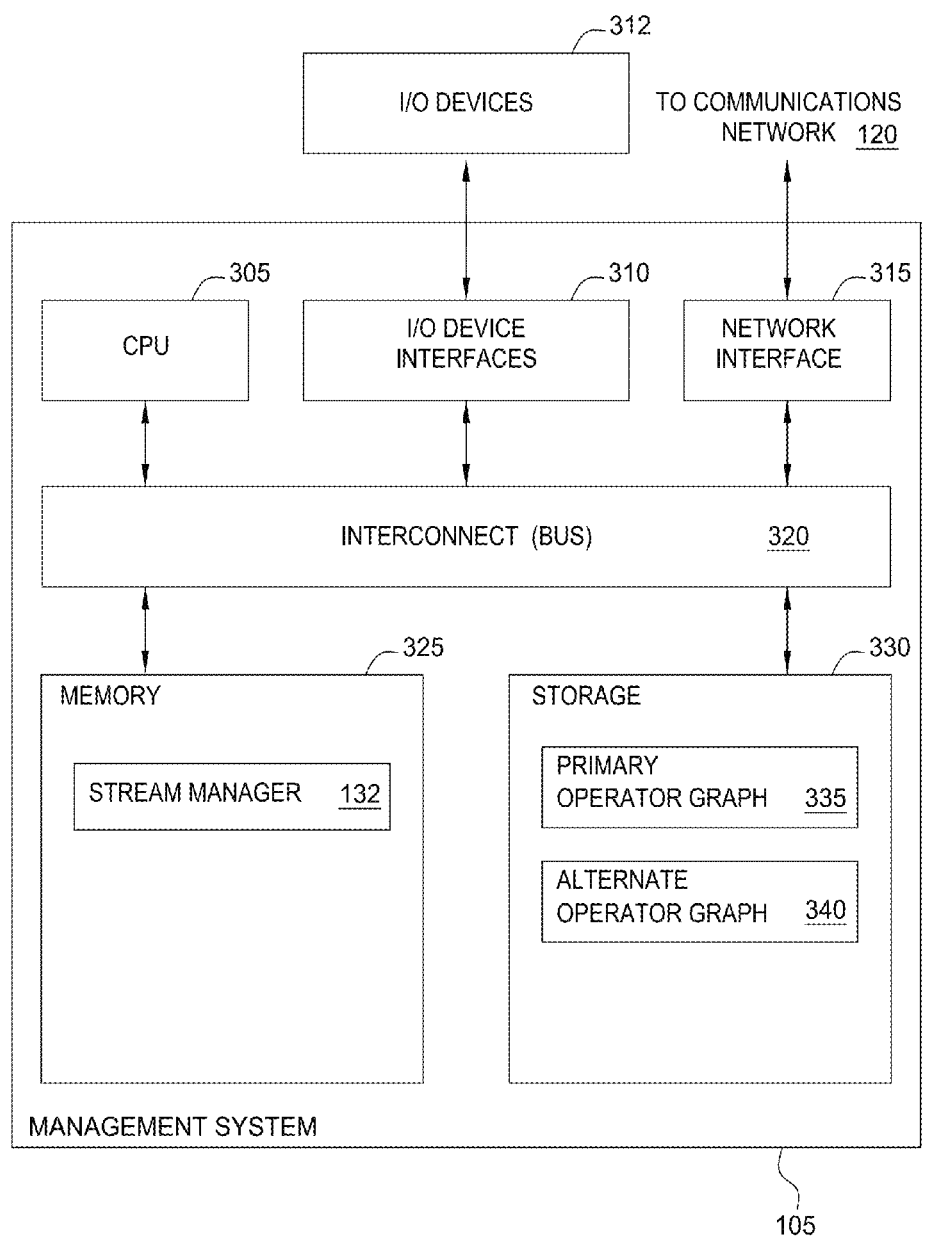
FIG. 3 is a more detailed view of the server computing system 105 of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 132. Additionally, the storage 330 includes a primary operator graph 335 and an alternate operator graph 340. The stream manager 132 may generally route tuples received as part of a data stream to PEs 235 to be processed, according to the primary operator graph 335. As discussed above, in one embodiment of the invention, if the EPT component 245 determines the estimated processing time exceeds the predetermined threshold time, the EPT component 245 may then route the given tuple to a second PE 235, according to an alternate execution path. In such a scenario, the alternate execution path may be specified by the alternate operator graph 240. Furthermore, the EPT component 245 may be configured to notify the stream manager 132 to route all subsequently-received tuples received for the data stream to PEs 235 according the alternate operator graph 340.

Figure 4:
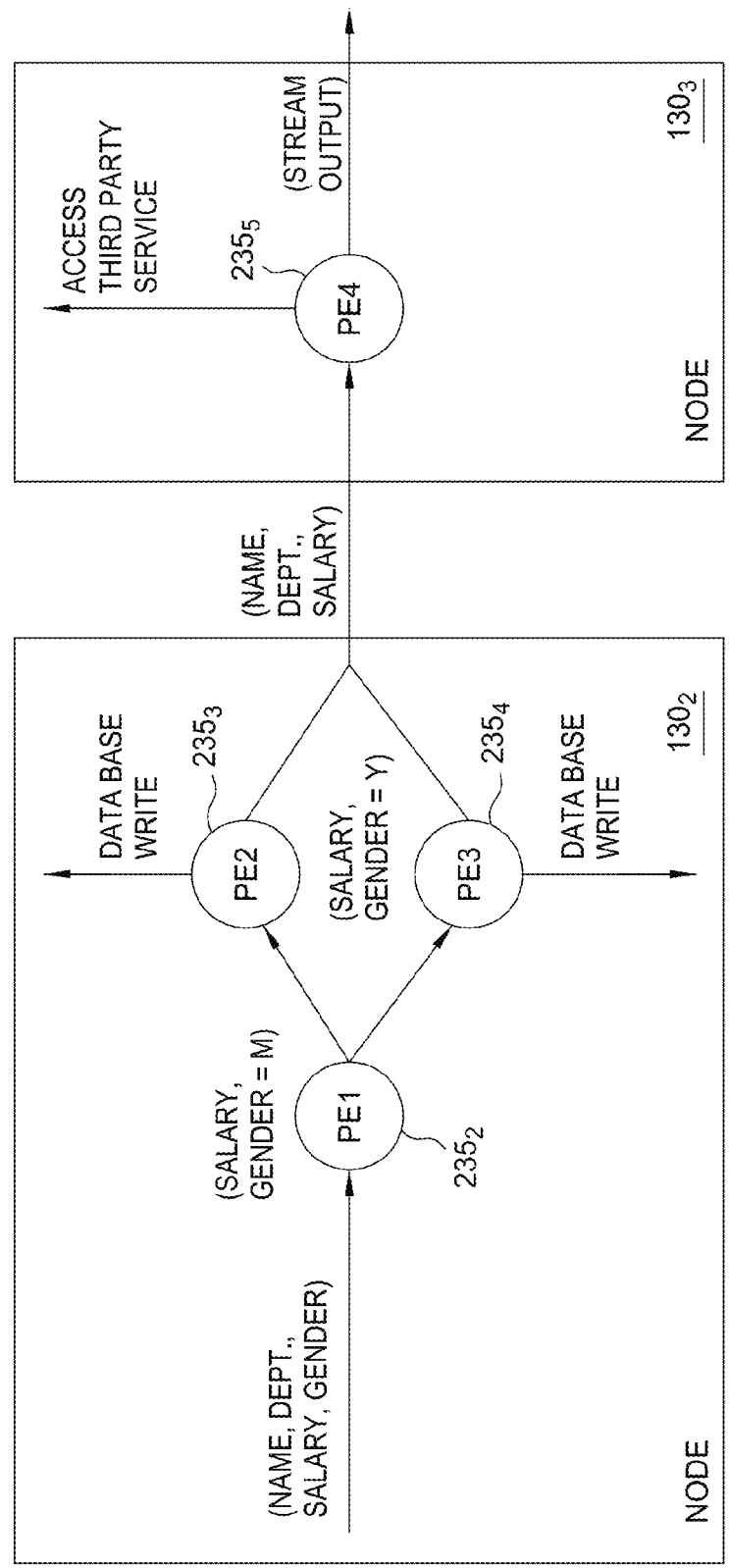
FIG. 4 illustrates an example of compute nodes in a stream application, according to one embodiment of the invention.

FIG. 4 illustrates an example of compute nodes in a stream application, according to one embodiment of the invention. As shown, compute node $130_2$ includes three processing elements $235_2$, $235_3$ and $235_4$ (labeled PE1-PE3). In the depicted example, processing element $235_2$ receives an N-tuple data stream and emits an N-tuple to processing elements $235_3$ and $235_4$ (labeled PE2 and PE3, respectively) on compute node $130_3$. Processing elements PE2 and PE3, in turn, emit N-tuples to processing element $235_5$ on compute node $130_3$. In this example, the PE 135 (labeled PE1), receives a tuple which includes attributes <name, department, salary, gender>. PE1 takes this N-tuple and generates one set of tuples sent to PE2 and another set of tuples sent to PE3, based on the gender value in a tuple received by PE1. In turn, PE2 and PE3 perform a database write for each tuple received from PE1 and generate a tuple of attributes <name, department, salary> sent to PE4. Once received, PE4 accesses a third-party web service and generates a tuple sent further downstream in the stream application.

Continuing the example, the depicted stream application may be such that the received tuples need to be processed as close to real-time as possible. As such, the stream application may process the tuples in a pipelined manner. As used herein, pipelined processing is any processing in which the result of processing by a first processing element is processed by the next processing element, the result of the processing by the next processing element is processed by a subsequent processing element, and so on. Thus, using the example depicted in FIG. 4, the processing is said to be pipelined because the result of the processing by PE1 is fed into either PE2 or PE3 for processing, and the result of PE2 and PE3 is fed into PE4 for further processing.

Because of the pipelined nature of the processing, a particular tuple of data that takes longer to process may delay not only the processing of the particular tuple, but all subsequently received tuples as well. For example, if on average a tuple is received every 5 milliseconds, and the exemplary stream application takes 4 milliseconds on average to process a tuple, the stream application will be able to process the received tuples without having a backlog of unprocessed tuples. However, further assume that a particular received tuple takes 5 minutes to process. This may occur because, for instance, the particular tuple may contain a specific attribute, the processing of which requires a third party service be accessed. For instance, if the "DEPT." attribute contains the value "ENGINEERING," the stream application may be configured to access an engineering-specific third party payroll service. If the connection between the stream application and the third party service is currently experiencing problems, the processing of the particular tuple may take substantially longer than normal to complete (e.g., 5 minutes versus 4 milliseconds). As such, because the processing of the particular tuple in the examples requires much longer than the average processing time of other tuples, the stream application will have a backlog of all the other tuples received during the 5 minute processing time, for all of which the processing will be delayed. Furthermore, the backlog (and accordingly, the delay) will continue to compound as other tuples are received containing the value "ENGINEERING" for the "DEPT." attribute.

Embodiments of the invention may remove particular runtime data that is predicted to take an excessively long amount of time to process, based on attribute profiling. According to embodiments of the invention, the EPT component 245 may profile each received tuple, before the tuple is processed. The profiling may take into account the attributes contained in the tuple, the values of those attributes, metadata about the attributes, historical data collected from the processing of other tuples, and so on. Once the profile is generated, the EPT component 245 may calculate an estimated processing time for the received tuple. The EPT component 245 may then determine whether the estimated processing time is less than or equal to a predetermined threshold time, and if it is, may send the received tuple to the appropriate processing element to be processed, according to the primary execution path (i.e., the standard processing path for received tuples). However, if the EPT component 245 determines the estimated processing time exceeds the predetermined threshold time, the EPT component 245 may avoid processing the received tuple using the processing element. Instead, the received tuple may then be processed using an alternate execution path. In another embodiment of the invention, the processing of the received tuple may be delayed until a later time (e.g., when the processing element becomes idle, or when the connection is no longer experiencing problems). In yet another embodiment, the received tuple may be simply discarded and not processed.

By avoiding processing the received tuple using the primary execution path when the estimated processing time exceeds the threshold time, embodiments of the invention help to avoid the situation where a particular tuple creates a backlog in the stream application. Furthermore, embodiments of the invention may be configured to delay or re-route the processing of the particular tuple, such that the data contained in the tuple is not lost to the stream application. These advantages are particularly relevant to stream applications where the received data needs to be processed as it is received and as close to real-time as possible.

Additionally, rather than using a predetermined threshold amount of time, embodiments of the invention may be configured to calculate the threshold amount of time based on one or more factors. In one embodiment of the invention, the EPT component 245 calculates the threshold amount of time based on the workload (or expected workload) of the system. For example, during peak processing hours, the EPT component 245 may set the threshold amount of time to a relatively short amount of time, since system resources are in high demand during this time. As a further example, during off-peak processing hours when the system resources are idle or operating a less than maximum capacity, the EPT component 245 may set the threshold amount of time to a relatively long amount of time. Advantageously, embodiments of the invention may in this way perform a type of load balancing, as lengthy queries (i.e., in terms of processing time) may be restricted when the system is operating under a heavy workload.

Figure 5:
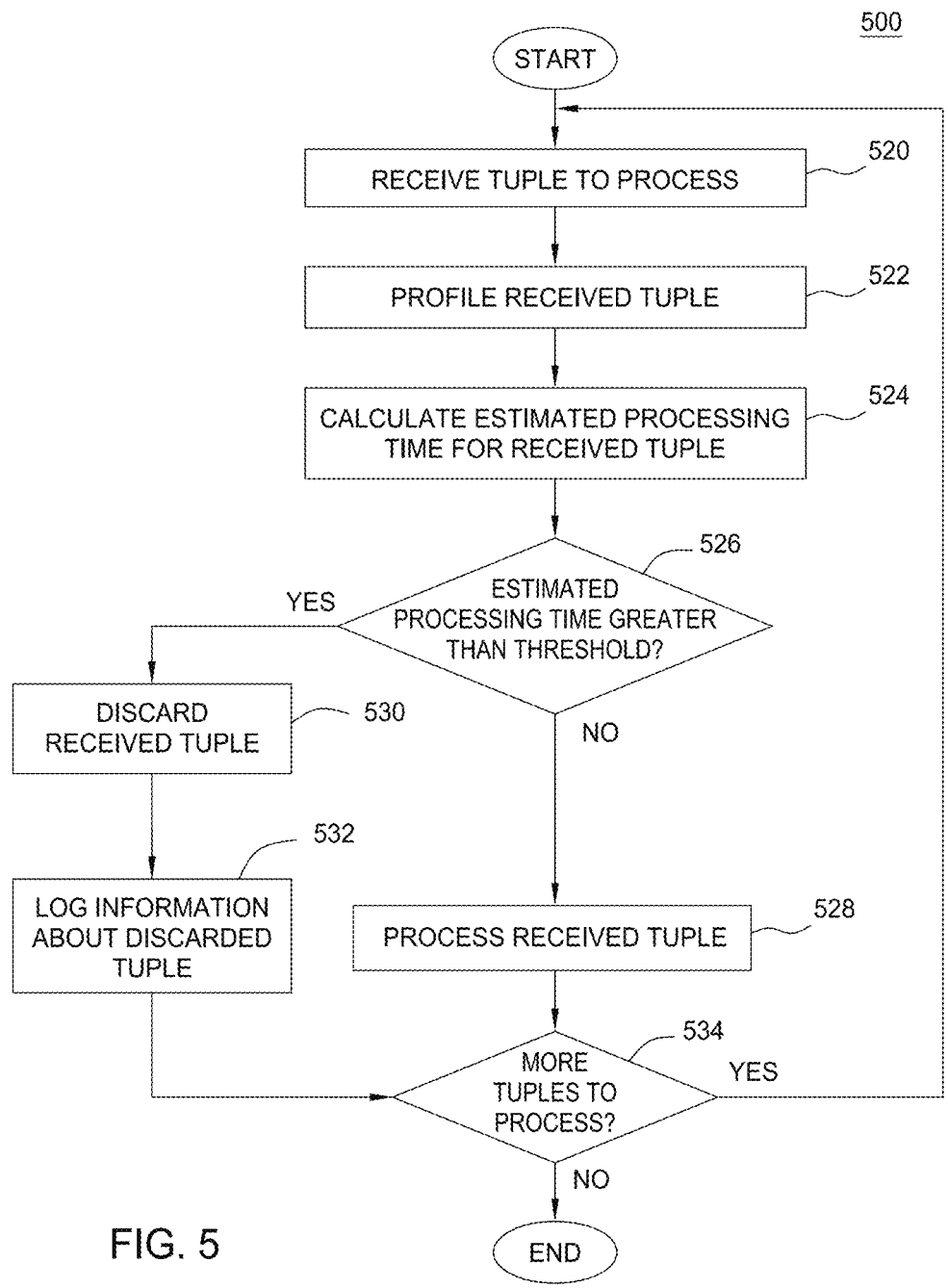
FIG. 5 is a flow diagram illustrating a method of predictive removal of runtime data, according to one embodiment of the invention.

FIG. 5 is a flow diagram illustrating a method of predictive removal of runtime data, according to one embodiment of the invention. As shown, the method 500 begins at step 520, where the EPT component 245 receives a tuple to process. In one embodiment, the tuple may be sent directly to the EPT component 245. In an alternate embodiment, the EPT component 245 may intercept tuples sent to a processing element 235, before they are received by the processing element 235.

Once the EPT component 245 receives the tuple, the EPT component 245 generates a profile for the received tuple (step 522). The profile may generally include information related to the received tuple. For example, the profile may include information on what attributes are contained within the received tuple, and may further contain information on the values of those attributes. Additionally, the profile may contain metadata about the received tuple. Exemplary metadata may include, without limitation, the number of attributes contained in the tuple, the sizes of attributes contained in the tuple, the types of attributes contained in the tuple, and a group to which the tuple belongs. The profile may further include information collected for previously processed tuples.

Once the EPT component 245 generates the profile for the received tuple, the EPT component 245 calculates an estimated processing time to process the received tuple (step 524). The EPT component 245 may base this determination on the generated profile for the received tuple. For example, the EPT component 245 may determine that, because the received tuple includes the value "MARKETING" for the "DEPT." attribute, the tuple will take approximately 15 milliseconds to process.

Once the estimated processing time is calculated, the EPT component 245 compares the estimated processing time with a predetermined threshold amount of time (step 526). If the EPT component 245 determines that the estimated processing time is greater than the threshold time, the EPT component discards the received tuple (step 530). The EPT component 245 then logs information about the discarded tuple (step 532). In one embodiment, the EPT component may also log the values of the attributes contained in the received tuple, so that the tuple may be processed at a later time. In an alternate embodiment, the EPT component 245 may instead route the received tuple to an alternate execution path to be processed. Additionally, the EPT component 245 may also be configured to route all subsequently-received tuples from the data stream to which the received tuple belongs to the alternate execution path.

If instead the EPT component 245 determines that the estimated processing time is not greater than the threshold amount of time, the EPT component 245 may send the received tuple to the appropriate processing element according to the primary execution path, where the tuple is then processed (step 528). Once the tuple is processed, or once the EPT component 245 has logged information about the discarded tuple, the EPT component 245 then determines whether there are more tuples to process (step 534). If the EPT component 245 determines there are more tuples to process, the method begins again at step 520, where the EPT component 245 receives the next tuple to process. If the EPT component 245 instead determines there are no more tuples to process, the method 500 ends.

One advantage to using the method 500 is that the stream application may avoid processing tuples which are likely to cause a substantial delay, using the primary execution path. As such, by processing only those tuples which are estimated to complete processing within the threshold amount of time, the method 500 helps to avoid the processing of any tuples which are likely to cause a "bottleneck" effect and create a backlog of tuples to be processed in the stream application. Furthermore, embodiments of the invention may be configured to delay the processing of tuples, the processing time of which is likely to exceed the threshold amount of time, or alternatively may process these tuples using an alternate execution path. As such, the data contained in these tuples will not be lost, while the primary execution path will not be delayed by processing them.

Figure 6:
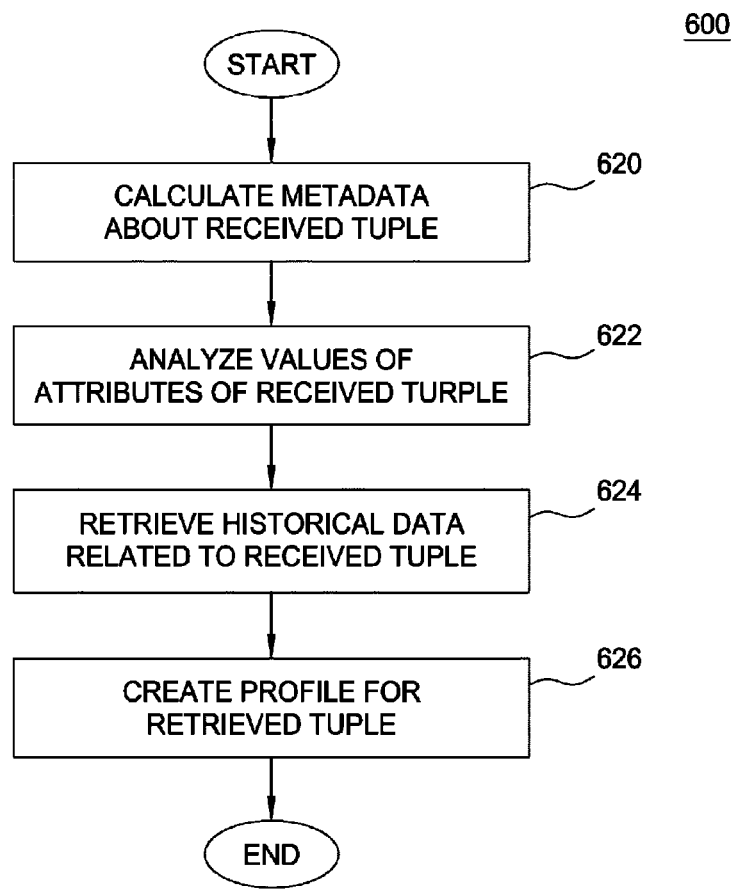
FIG. 6 is a flow diagram illustrating a method of profiling a tuple, according to one embodiment of the invention.

FIG. 6 is a flow diagram illustrating a method of profiling a tuple, according to one embodiment of the invention. As shown, the method 600 begins at step 620, where the EPT component 245 calculates metadata about a received tuple. As described above, exemplary metadata may include the number of attributes contained in the tuple, the sizes of attributes contained in the tuple, the types of attributes contained in the tuple, and a group to which the tuple belongs. Of course, the above examples are for illustrative purposes only, and one of ordinary skill in the art will recognize that other metadata about the received tuple may be collected.

Once the metadata is calculated, the EPT component 245 analyzes the values of the attributes contained in the received tuple (step 622). For example, the EPT component 245 may determine that the received tuple contains a value of "ENGINEERING" for the "DEPT." attribute. The EPT component 245 then retrieves historical data related to the received tuple (step 624). For example, if the received tuple contains a "DEPT." attribute with a value "ENGINEERING," the EPT component 245 may retrieve historical data related to the processing of other tuples that contained the value "ENGINEERING" for the "DEPT." attribute. Once the historical data is retrieved, the EPT component 245 then creates a profile for the retrieved tuple (step 626).

By generating a profile for the received tuple, the EPT component 245 may then use the generated profile to estimate the processing time of the tuple. For example, the EPT component 245 may estimate that because a particular tuple contains the value "ENGINEERING" for the "DEPT." attribute, the tuple will take 50 milliseconds to process. As another example, the profile may contain historical information on the processing of other related tuples. For instance, a profile may contain information indicating that three tuples containing the value "ENGINEERING" for the "DEPT." attribute were processed, with processing times of 10 milliseconds, 20 milliseconds and 30 milliseconds. As such, the EPT component 245 may determine that the estimated processing time of a tuple containing the value "ENGINEERING" for the "DEPT." attribute will be the average of the three previously-record times, and thus will be 20 milliseconds. By considering these and other factors, the EPT component 245 may generate a thorough profile for the received tuple, which may then be used to calculate an accurate estimated processing time for the tuple. Furthermore, while the above examples focus on analyzing a single attribute in the tuple, embodiments of the invention may of course look at multiple or all attributes in received tuple, as well as other related information, when calculating the estimated processing time for the tuple.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of processing a data stream, in a data streaming environment comprising a plurality of processing elements executing on a plurality of compute nodes, wherein each of the plurality of compute nodes hosts one or more of the plurality of processing elements, wherein the plurality of processing elements are interconnected by an operator graph, and wherein each of the processing elements is configured to receive an incoming tuple of the data stream and to perform a respective one or more processing operations on the incoming tuple, comprising:
  receiving a first tuple of the data stream to be processed that includes a plurality of attributes;
  calculating, by operation of one or more computer processors, an estimated processing time for processing the received first tuple, based at least in part on one or more attributes of the plurality of attributes;
  upon determining the calculated estimated processing time does not exceed a predetermined threshold time, processing the first tuple in a first manner using a first execution path through the operator graph; and upon determining the calculated estimated processing time exceeds the predetermined threshold time, processing the received first tuple comprising at least one of (i) discarding the first tuple, (ii) storing the first tuple to be processed as idle resources become available, and upon determining that at least one idle resource in the first execution path is available, processing the stored first tuple using the first execution path, and (iii) processing the first tuple using a second execution path through the operator graph, the second execution path distinct from the first execution path.

2. The method of claim 1, wherein processing the received first tuple of the data stream using the first execution path further comprises:

calculating an actual execution time for processing the received first tuple of the data stream using the first execution path; and storing the actual execution time and an identifier of the processed first tuple to the historical data.

3. The method of claim 1, wherein calculating the estimated processing time for processing the received first tuple of the data stream is further based on historical data collected from processing other tuples.

4. A system, comprising:

a computer processor; and a memory containing a program that, when executed on the computer processor, performs an operation for processing a data stream, in a data streaming environment comprising a plurality of processing elements executing on a plurality of compute nodes, wherein each of the plurality of compute nodes hosts one or more of the plurality of processing elements, wherein the plurality of processing elements are interconnected by an operator graph, and wherein each of the processing elements is configured to receive an incoming tuple of the data stream and to perform a respective one or more processing operations on the incoming tuple, comprising:

receiving a first tuple of the data stream to be processed that includes a plurality of attributes;

calculating an estimated processing time for processing the received first tuple, based at least in part on one or more attributes of the plurality of attributes;

upon determining the calculated estimated processing time does not exceed a predetermined threshold time, processing the received first tuple in a first manner using a first execution path through the operator graph; and upon determining the calculated estimated processing time exceeds the predetermined threshold time, processing the received first tuple comprising at least one of (i) discarding the first tuple, (ii) storing the first tuple to be processed as idle resources become available, and upon determining that at least one idle resource in the first execution path is available, processing the stored first tuple using the first execution path, and (iii) processing the first tuple using a second execution path through the operator graph, the second execution path distinct from the first execution path.

5. The system of claim 4, wherein the processing elements in the plurality of processing elements are configured to process tuples of the data stream in a sequential manner according to a specified execution path.

6. The system of claim 4, wherein processing the received first tuple of the data stream using the first execution path further comprises:

calculating an actual execution time for processing the received first tuple of the data stream using the first execution path; and storing the actual execution time and an identifier of the processed first tuple to the historical data.

7. The system of claim 4, wherein calculating the estimated processing time for processing the received data stream, is further based on historical data collected from processing other tuples.

8. A computer program product for processing a data stream, in a data streaming environment comprising a plurality of processing elements executing on a plurality of compute nodes, wherein each of the plurality of compute nodes hosts one or more of the plurality of processing elements, wherein the plurality of processing elements are interconnected by an operator graph, and wherein each of the processing elements is configured to receive an incoming tuple of the data stream and to perform a respective one or more processing operations on the incoming tuple, comprising:

a computer-readable storage memory having computer readable program code embodied therewith, the computer readable program code comprising:

computer readable program code to receive a first tuple of the data stream to be processed that includes a plurality of attributes;

computer readable program code to calculate an estimated processing time for processing the received first tuple, based at least in part on one or more attributes of the plurality of attributes;

computer readable program code to, upon determining the calculated estimated processing time does not exceed a threshold time, process the first tuple in a first manner using a first execution path through the operator graph; and computer readable program code to, upon determining the calculated estimated processing time exceeds the predetermined threshold time, process the received first tuple comprising at least one of (i) discarding the first tuple, (ii) storing the first tuple to be processed as idle resources become available, and upon determining that at least one idle resource in the first execution path is available, processing the stored first tuple using the first execution path, and (iii) processing the first tuple using a second execution path through the operator graph, the second execution path distinct from the first execution path.

9. The computer program product of claim 8, further comprising:

computer readable program code to, upon determining the calculated estimated processing time exceeds the threshold time, process all subsequent tuples of the data stream using an alternate execution path through the operator graph.

10. The computer program product of claim 8, wherein the computer readable program code to process the data stream using the first execution path further comprises:

computer readable program code to calculate an actual execution time for processing the received first tuple of the data stream using the first execution path; and computer readable program code to store the actual execution time and an identifier of the processed first tuple to the historical data.

11. The computer program product of claim 8, wherein the computer readable program code to calculate the estimated processing time for processing the received data stream is further based on historical data collected from processing other tuples.

12. The computer program product of claim 8, further comprising:
   computer readable program code to calculate the threshold time, wherein the calculation is based on at least one of (i) a current workload of at least one processing element in the first execution path and (ii) a predicted workload of the at least one processing element in the first execution path.

13. A computer-implemented method of processing a data stream, in a data streaming environment comprising a plurality of processing elements executing on a plurality of compute nodes, wherein each of the plurality of compute nodes hosts one or more of the plurality of processing elements, wherein the plurality of processing elements are interconnected by an operator graph, and wherein each of the processing elements is configured to receive an incoming tuple of the data stream and to perform a respective one or more processing operations on the incoming tuple comprising:
   receiving a first tuple of the data stream to be processed that includes a plurality of attributes;
   calculating, by operation of one or more computer processors, an estimated processing time for processing the received first tuple, based at least in part on one or more attributes of the plurality of attributes;
   upon determining the calculated estimated processing time does not exceed a predetermined threshold time, processing the first tuple in a first manner using a first execution path through the operator graph; and
   upon determining the calculated estimated processing time exceeds the predetermined threshold time, processing the first tuple in a second manner that minimizes any delay to processing elements in the first execution path, comprising at least one of (i) discarding the first tuple, (ii) storing the first tuple to be processed as idle resources become available, and upon determining that at least one idle resource in the first execution path is available, processing the stored first tuple using the first execution path, and (iii) processing the first tuple using a second execution path through the operator graph, the second execution path distinct from the first execution path.

14. The method of claim 13, further comprising collecting metadata describing the received first tuple of the data stream.

15. The method of claim 13, wherein the metadata includes at least one of (i) a number of attributes in the plurality of attributes, (ii) a length of one or more attributes in the plurality of attributes, and (iii) a type of one or more attributes in the plurality of attributes.

16. The computer program product of claim 8, further comprising:
   computer readable program code to monitor a current workload of at least one processing element in the first execution path; and
   computer readable program code to adjust the threshold time based on the current workload.

17. The computer program product of claim 16, wherein the computer readable program code to adjust the threshold amount of time further comprises:
   computer readable program code to, upon determining the current workload exceeds a first workload value, decrease the threshold time to reduce an overall workload of the at least one processing element in the first execution path; and
   computer readable program code to, upon determining the current workload is less than a second workload value, increase the threshold time to increase the overall workload of the at least one processing element in the first execution path.

* * * * *